Nov. 2, 1965 A. H. BOBECK 3,215,993

MAGNETIC CORE SWITCHING CIRCUITS

Filed May 31, 1961 2 Sheets-Sheet 1

INVENTOR
A. H. BOBECK
BY William H. Kamstra
ATTORNEY

INVENTOR
A. H. BOBECK
BY William H. Kamstra
ATTORNEY

United States Patent Office 3,215,993
Patented Nov. 2, 1965

3,215,993

MAGNETIC CORE SWITCHING CIRCUITS

Andrew H. Bobeck, Chatham, N.J., assignor to Bell Telephone Laboratories, Incorporated, New York, N.Y., a corporation of New York Filed May 31, 1961, Ser. No. 113,814
2 Claims. (Cl. 340—174)

Figure 1:
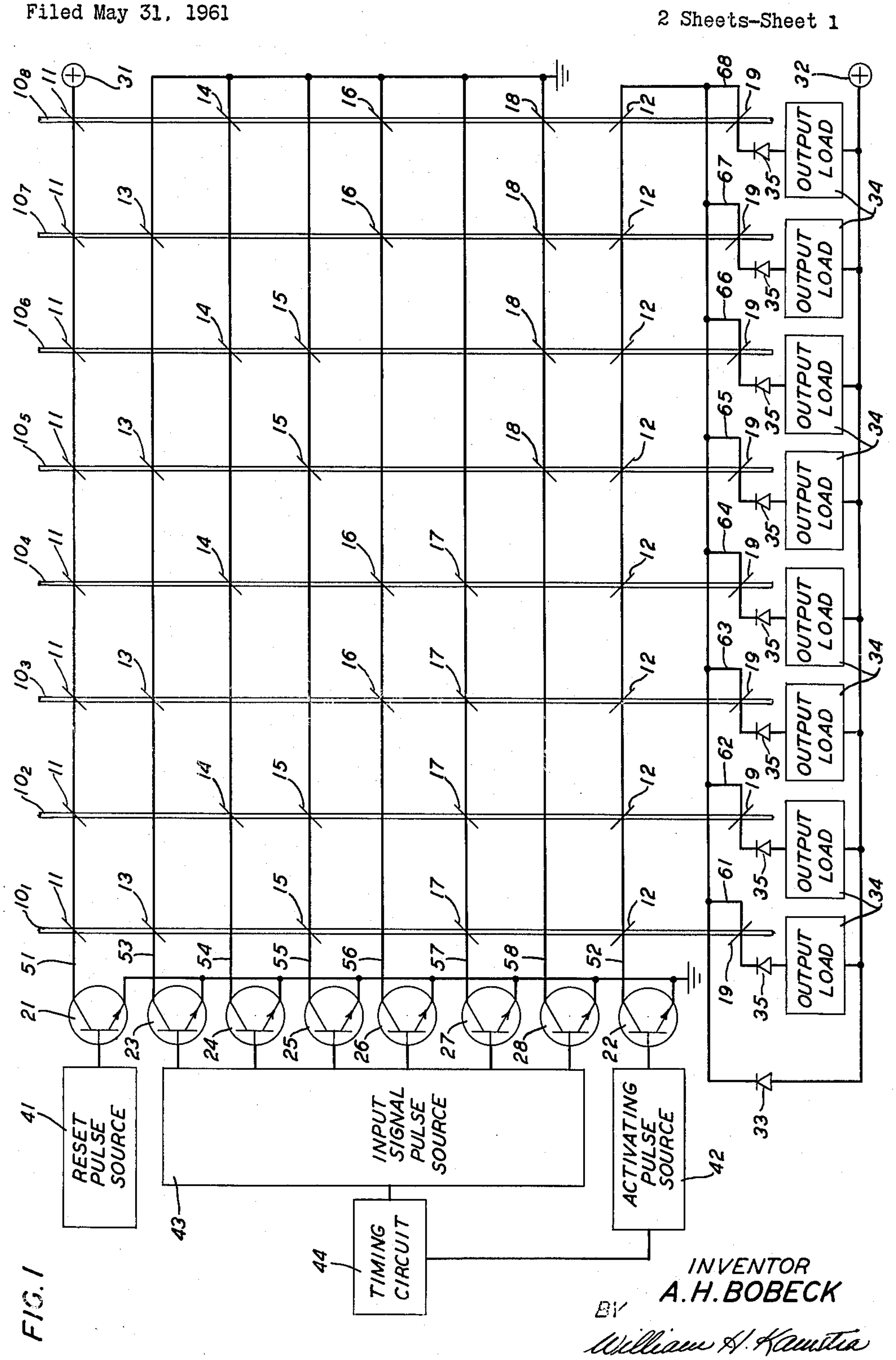

This invention relates to electrical switching circuits and more particularly to switching circuits utilizing magnetic cores.

In electrical circuits it is often necessary to apply a current pulse to one of a number of possible loads in response to an activating pulse, the particular one of the loads being determined by information stored in the circuit or in associated circuitry.

A well known circuit element having properties which make it advantageous for utilization in pulse switching circuits is a magnetic core having substantially rectangular hysteresis characteristics. In general, output windings on the cores are connected to respective ones of a plurality of output loads and signals are applied to these loads by selectively switching the cores between two states of remanent magnetization. Thus, if all but a selected core are in one of these states of remanent magnetization and a signal, of a polarity tending to drive the cores to this state, is applied to input windings of all the cores, only the selected core will undergo switching and a signal induced in its output winding will be applied to its associated load. During the output phase of operation the unselected cores, pulsed in a sense opposite to that which would switch them, are shuttled from a state of remanent magnetization to a state of saturated magnetization. This shuttling results from the departure of the hysteresis loops of the cores from perfect rectangularity and causes a shuttle voltage to be induced in the output windings of the unselected cores. Since it would be desirable to achieve outputs consisting of either a switching voltage pulse or no pulse at all depending upon whether a core is switched or shuttled, cores having hysteresis charcteristics of substantial rectangularity are generally required in order to minimize shuttle signals.

It is accordingly an object of this invention to provide a novel magnetic switching circuit utilizing magnetic cores, the operation of which is not dependent upon the use of core material having a high degree of rectangularity in its hysteresis loop.

It is another object of this invention to provide improved pulse switching circuits employing magnetic cores.

It is a further object of this invention to reduce the power requirement of magnetic core switching circuits and more specifically to reduce the input pulse power required by such circuits.

The above and other objects are realized in one embodiment according to the principles of this invention comprising a switching circuit utilizing toroidal magnetic cores each of which has a control winding inductively coupled thereto. The control windings are connected between ground and shorting switches which comprise transistors whose emitter-collector circuits are connected between the shorting windings and ground. The shorting switches are used to short selectively particular cores and a core will hereinafter be considered shorted whenever a control winding coupled thereto has thus been shorted to ground. A shorted core is prevented from switching in response to signals applied to an activating winding also inductively coupled to the core. Switching is prevented since the shorted control windings contain no impedance elements and relatively large currents consequently flow therein responsive to any flux reversed in the shorted cores. As soon as the flux in a shorted core begins to switch in response to a signal applied to its activating winding, a current is generated in the shorted winding creating a magnetic field which opposes the flux reversal and thereby prevents the switching of the core. Since the currents flowing in the shorted windings are induced by incremental flux changes in shorted cores, no power supplies are needed in the transistor-shorting winding circuits. Particular ones of the transistor switches are activated by the application of input signals to the bases of the particular transistors. Since the input signal currents are much smaller than the currents flowing in the emitter-collector-shorted winding circuits and since the input currents are not used to switch particular cores, a substantial saving in required input power results. Furthermore, it is not a requisite of this invention that the cores utilized have a high degree of rectangularity in their hysteresis characteristics since shorted cores are prevented from switching more than a minimal amount even though their hysteresis loops depart substantially from the rectangular.

A current pulse may be directed to one of a plurality of loads by selectively shorting all of the cores except that one associated with the selected load. An activating signal applied to the activating windings of all the cores is diverted to the selected load by means of a circuit configuration shown in Patent 2,719,961 of M. Karnaugh issued October 4, 1955. The activating windings on the cores are connected in series and output windings coupled to the cores are connected in parallel from the last of the activating windings. All of the cores are initially driven to a reset magnetic condition and all but a selected one of the cores are shorted. The output windings are wound so that a forward electromotive force is developed thereacross by a core switching from the reset to the set condition. An activating signal is then applied to the activating windings, the selected core switches and the electromotive force generated in its output winding serves to draw the activating signal through that winding to the selected load.

According to another embodiment of this invention a current pulse is directed to one of a plurailty of loads by selectively shorting that core associated with the selected load. An activating signal applied to the activating windings of all the cores is diverted to the selected load by a circuit connection as shown in another Patent 2,719,773 of M. Karnaugh issued October 4, 1955. The activating windings on the cores are again connected in series and output windings coupled to the cores are connected in parallel from the last of the activated windings. All of the cores are initially driven to a reset magnetic condition and the selected core is shorted. In this case, however, the output windings are wound so that a back rather than a forward electromotive force is developed thereacross by a core switching from the reset to the set condition. An activating signal is then applied to the activating windings, the unselected cores switch and the electromotive forces generated in their output windings serve to prevent the activating current from flowing in these windings and force it to flow through the output winding of the shorted core to the selected load.

Thus, according to one feature of this invention, an electrical circuit comprises a number of magnetic cores having activating, output, and control windings thereon, the activating windings being connected in series and the output windings being connected in an output winding network defining a plurality of paths connected to the last of the activating windings, loads associated with particular cores being selected by shorting the control windings of particular ones of the cores.

According to another feature of this invention the control windings are each connected between ground and a transistor switch also connected to ground, the transistor switches being utilized to short particular ones of the cores.

Figure 2:
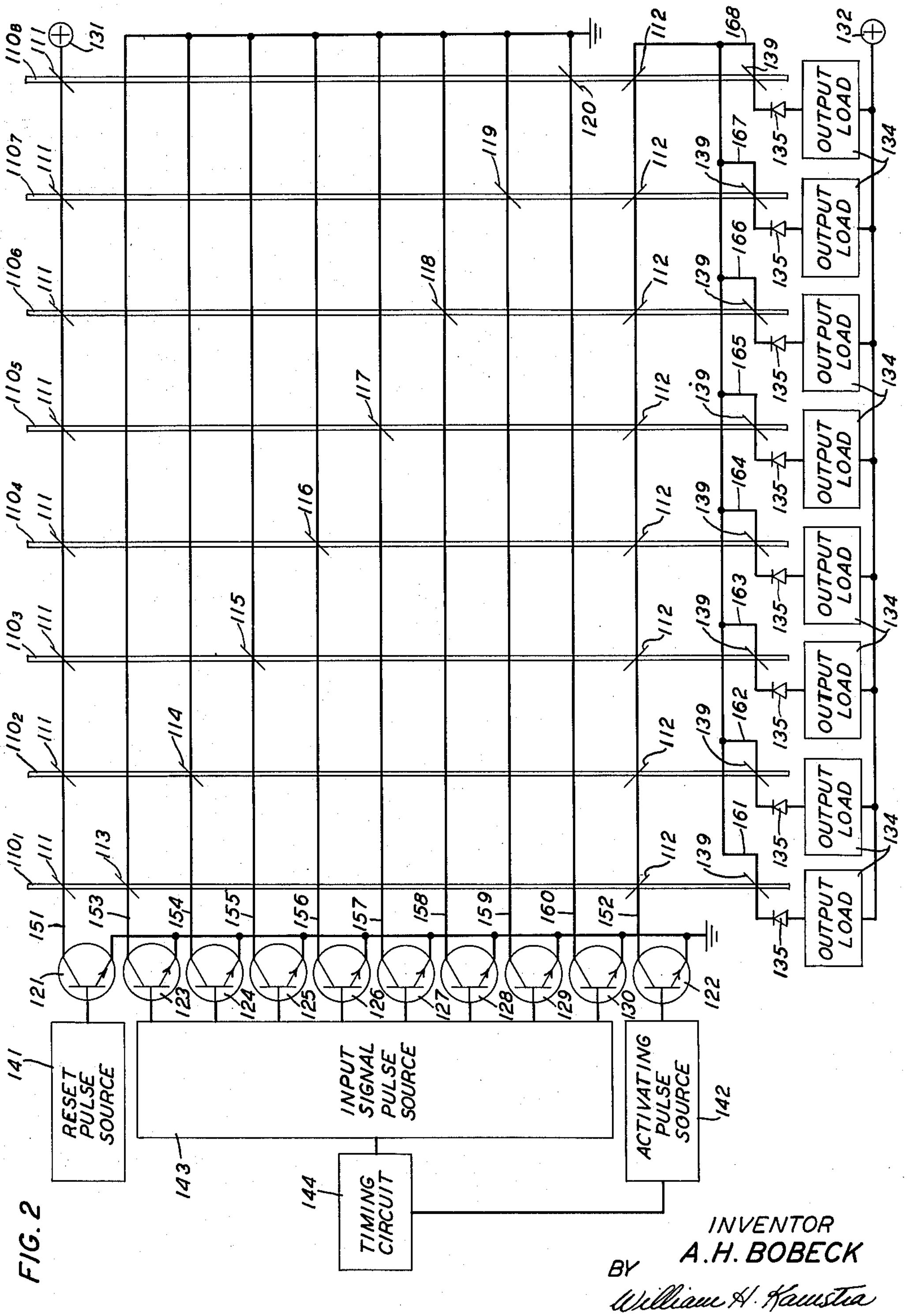

The foregoing and other objects and features of this invention will be more clearly understood from a consideration of the detailed description thereof which follows when taken in conjunction with the accompanying drawing which utilizes the well known mirror symbol notation described by M. Karnaugh in the Proceedings of the IRE, vol. 43, of May 1955, at page 570, and in which:

FIG. 1 is a schematic representation of a switching circuit in accordance with one specific illustrative embodiment of this invention in which ouput windings are so wound on respective cores as to develop forward electromotive forces thereacross upon setting of the cores; and FIG. 2 is a schematic representation of a switching circuit in accordance with another specific illustrative embodiment of this invention in which output windings are so wound on respective magnetic cores as to develop back electromotive forces thereacross upon setting of the cores.

Turning now to FIG. 1, the embodiment of this invention there depicted comprises eight magnetic cores $10_1$ through $10_8$, which may be of the well known ferrite type capable of assuming either of two conditions of remanent magnetization to which driven by an applied magnetomotive force. A plurality of windings are coupled to each core including serially connected reset windings 11 and serially connected activating windings 12 connected by leads 51 and 52, respectively, to the collectors of transistors 21 and 22, respectively. The emitters of transistors 21 and 22 are connected to a source of ground potential. A source of reset pulses 41 is connected to the base of transistor 21 and is shown herein in block diagram form. Source 41 may comprise any well known circuit capable of supplying positive pulses at predetermined intervals. Transistor 21 is utilized as a well known transistor switch to supply current signals in the windings 11 to drive cores $10_1$ through $10_8$ to a first condition of remanent magnetization whenever a signal is applied to transistor 21 from source 41. In a similar manner a source of activating signals 42 is connected to the base of transistor 22 which operates as a switch to supply current signals in the windings 12 to drive cores $10_1$ through $10_8$ to a second condition of remanent magnetization whenever a signal is applied to the transistor from source 42. The source 42 shown in block diagram form may also comprise any well known circuit capable of applying positive signals at predetermined intervals to transistor 22.

Serially connected control windings 13 are inductively coupled to cores $10_1$, $10_3$, $10_5$, and $10_7$, and similarly coupled are control windings 14 to cores $10_2$, $10_4$, $10_6$, and $10_8$, control windings 15 to cores $10_1$, $10_2$ $10_5$, and $10_6$, control windings 16 to cores $10_3$, $10_4$, $10_7$, and $10_8$, control windings 17 to cores $10_1$, $10_2$, $10_3$, and $10_4$, and control windings 18 to cores $10_5$, $10_6$, $10_7$, and $10_8$. The serially connected control windings 3 through 18 are connected by leads 53 through 58, respectively, between a source of ground potential and the collectors of transistors 23 through 28, respectively. The emitters of transistors 23 through 28 are connected to a source of ground potential and their bases are connected to a source of input current signals 43. The source 43 is also shown in block diagram form and may comprise any well known circuit capable of selectively applying current signals to predetermined ones of the transistors 23 through 28 to drive these transistors into saturation thereby permitting currents to flow in any of the leads 53 through 58, respectively, responsive to the inducement of voltages in any of the control windings 13 through 18, respectively. Timing circuit 44, shown in block diagram form, is connected to input source 43 and activating source 42 and may comprise any well known circuit capable of controlling the energization of sources 42 and 43.

Lead 51 is connected at its other end to a positive voltage source 31. Lead 52 is connected at its other end to a diode 33 and a plurality of branch output circuits 61 through 68. The diode 33 and output circuits 61 through

68 are connected at their other ends to a positive voltage source 32. Each of the output circuits 61 through 68 has included therein a serially connected output load 34, a diode 35 and an output winding 19. The output windings 19 of circuits 61 through 68 are inductively coupled to the cores $10_1$ through $10_8$, respectively, and the polarity of their coupling is in a direction such that a forward electromotive force is developed across an output winding 19 when its associated core is driven to a second condition of remanent magnetization by a current in lead 52. Bearing in mind the foregoing organization, a detailed description of the operation of this circuit will now be set forth.

Upon the application of a positive reset pulse from source 41 the switch comprising transistor 21 is activated permitting a current to flow from voltage source 31 through windings 11, lead 51 and transistor 21 to ground. The cores $10_1$ through $10_8$ are consequently driven to a first, reset condition of remanent magnetization which may be understood as downward as viewed in the drawing. A signal may subsequently be directed to a particular one of the output loads 34 by applying a signal from activating source 42 to lead 52 simultaneously with signals from input source 43 to selected particular ones of the leads 53 through 58. The timing circuit 44 controls the timing of the signals applied to transistors 22 and 23 through 28 from the sources 42 and 43, respectively, to ensure that the activating signal applied to transistor 22 does not occur prior to the input signals applied to particular ones of the transistors 23 through 28. The activating signal from source 42 activates the switch including transistor 22 and enables a current to flow from voltage source 32 through a particular one of the output circuits 61 through 68, windings 12, lead 52 and transistor 22 to ground. The input signals applied to particular ones of the transistors 23 through 28 saturate these transistors and permit currents to flow in those leads 53 through 58 associated with these particular transistors responsive to voltage signals induced in any of the windings 13 through 18 included in these leads. In view of the winding combinations of the latter windings, the input signals applied to the particular transistors are effective to short all but one of the cores $10_1$ through $10_8$ thereby preventing all but this one core from being driven to a second, set state of remanent magnetization, which state is understood as upward as viewed in the drawing, by the activating signal applied to the activating windings 12. The shorted cores are prevented from switching by currents generated in their shorted control windings 13 through 18. Currents appear in these windings as soon as any flux in a shorted core begins to switch in response to the signal applied to its activating winding 12; these currents produce fields which oppose the flux reversal and thereby prevent the shorted cores from switching. Since the currents in the shorted windings are caused by voltages induced in the input windings 13 through 18, no power supplies are needed for the shorting switches including transistors 23 through 28 and a substantial saving in the required input power level is thus realized.

Since only a particular one of the cores $10_1$ through $10_8$ switches in response to the coincident input and activating signals, a voltage is induced in only that output winding 19 coupled to the particular core. The voltage induced in this winding 19 serves to draw the activating current through the winding 19, diode 35 and output load 34 associated with this particular core. The activating windings 12 advantageously have more turns than the output windings 19. Since the magnetomotive force created in the winding 19 opposes that in the winding 12 of the particular selected core, the windings 12 should have a sufficiently larger number of turns than the windings 19 to ensure that the net electromotive force produced is sufficient to drive the selected core to its set state of remanent magnetizaion.

In an exemplary cycle of operation the output load 34 in output circuit 62 may, for example, be chosen as the load to which a signal is to be directed. Following the resetting of all the cores $10_1$ through $10_8$ by a signal from source 41, an activating signal is applied to transistor 22 coincidentally with input signals applied to transistors 23, 26 and 28. These input signals close the transistor shorting switches and short cores $10_1$ and $10_3$ through $10_8$. The activating signal produces a current flow in the windings 12 coupled to the cores 10 and since core $10_2$ is the only one which is not shorted, only that core is switched to a set condition and a voltage is simultaneously induced in the output winding 19 of the core $10_2$. The voltage induced in this winding 19 draws the current flowing in lead 52 through output circuit 62 and through the desired output load 34. After core $10_2$ has been switched the activating current flows through diode 33 to ground because of the lower impedance of the diode rather than through unselected output loads.

FIG. 2 depicts another specific illustrative embodiment of this invention comprising magnetic cores $110_1$ through $110_8$ which may also be of the well known ferrite type capable of assuming either of two remanent magnetic conditions to which driven by applied magnetomotive forces. A plurality of windings are likewise placed on each core including serially connected reset windings 111 and serially connected activating windings 112 connected by leads 151 and 152, respectively, to the collectors of transistors 121 and 122, respectively. The emitters of transistors 121 and 122 are connected to a source of ground potential. A source of reset pulses 141 is connected to the base of transistor 121 and a source of activating pulses 142 is connected to the base of transistor 122. Both pulse sources are shown in block diagram form and may comprise well known circuits capable of supplying pulses of the character described herein. Control windings 113 through 120 are inductively coupled to cores $110_1$ through $110_8$, respectively, and are connected by leads 153 through 160, respectively, between a source of ground potential and the collectors of transistors 123 through 130, respectively. The emitters of transistors 123 through 130 are connected to a source of ground potential and their bases are connected to a source of input pulse signals 143, also shown in block diagram form, which may comprise any well known circuit capable of supplying input signals of the character described herein. Timing circuit 144 shown in block diagram form, is connected to input source 143 and activating source 142 and may comprise any well known circuit capable of controlling the energization of sources 142 and 143.

Lead 151 is connected at its other end to a positive voltage source 131. Lead 152 is connected at its other end to each of a plurality of output circuits 161 through 168. The output circuits 161 through 168 are connected at their other ends to a positive voltage source 132 and each of the output circuits 161 through 168 has included therein a serially connected output load 134, a diode 135 and an output winding 139. The output windings 139 of circuits 161 through 168 are inductively coupled to the cores $110_1$ through $110_8$, respectively, and, in this embodiment, the polarity of this coupling is in a direction such that a back electromotive force is developed across an output winding 139 when its associated core is driven to a set condition of magnetic remanence by an activating current in lead 152.

The operation of the embodiment of FIG. 2 is similar to that of the arrangement discussed in connection with FIG. 1. However, in the embodiment of FIG. 2 a signal is directed to a particular one of the output loads 134 by shorting only a selected one of the cores $110_1$ through $110_8$ rather than by shorting all but one of them. The activating signal appearing in the windings 112 switches the remaining cores to a set condition of remanent magnetization and thereby causes voltage signals to be induced in the output windings 139 of these cores. The voltages induced in the windings 139 are, in this embodiment, of a polarity which prevents the activating current from flowing in these windings and causes the entire activating current to flow through the output circuit and output load 134 associated with the shorted core.

Thus, if the load 134 of circuit 162, for example, is chosen as the load to which a signal is to be directed, only the core $110_2$ is shorted. Following the resetting of all the cores, core $110_2$ is shorted by an input signal applied to transistor 124 from input source 143. An activating signal is coincidentally applied to transistor 122 thereby causing a current flow in lead 152 which sets cores $10_1$ and $10_3$ through $10_8$ to a set condition of remanent magnetization. The setting of these cores induces electromotive forces in the output windings 139 of these cores which prevent the current in lead 152 from flowing in any of the output circuits 161 and 163 through 168 and therefore serve to direct it through circuit 162 and the selected output load 134.

The two illustrative embodiments of this invention have both been discussed in connection with the direction of the activating current through a particular one of the output loads; however, it is clear that this invention could also advantageously be used when it is desired to send signals through more than one of a plurality of output loads.

Although this invention can find application whenever it is desired to direct signals to particular ones of a plurality of loads, one advantageous use is as an access switch associated with a memory array. The output loads of the switch of this invention may then comprise a row of memory elements of the array.

Furthermore, although the illustrative embodiments of this invention described above utilized magnetic cores capable of remaining in either of two remanent magnetic states, these cores need not have substantially rectangular hysteresis characteristics. Since the shorted cores are prevented from switching more than a minimal amount regardless of the shape of their hysteresis characteristics, no problem of shuttle signals arises and the core material utilized in this invention may be nonrectangular and may even be linear. If substantially linear core material is utilized, a resetting means will not be required in this invention since the material will return to an essentially nonmagnetized condition upon the removal of the activating signal. In this case the activating signal would act to switch selected cores from an essentially nonmagnetized condition to a saturated condition rather than from one remanent condition to an opposite saturated condition.

The illustrative embodiments of this invention described above have also utilized output arrangements according to the patents of M. Karnaugh previously referred to; however, it is clear that this invention is not limited to those output arrangements and that other output means, such as the use of output windings in which output signals are induced by the switching of selected cores, are within the scope of the shorted core circuits of this invention.

What have been described are considered to be only illustrative embodiments of the present invention. It is therefore to be understood that various and numerous other arrangements may be devised by one skilled in the art without departing from the spirit and scope thereof.

What is claimed is:

1. An electrical switching circuit comprising a plurality of magnetic cores, each of said cores having hysteresis characteristics exhibiting magnetic remanence and each having a control winding, a reset winding, an activating winding and an output winding inductively coupled thereto, means for serially connecting said activating windings, a plurality of output circuits connected to the last of said serially connected activating windings, each of said output circuits including a respective one of said output windings and a load means, means for establishing a first remanent magnetic condition in all of said cores including means for applying reset signals to all of said reset windings, means for selectively short circuiting the control winding of a particular one of said cores including a transistor connected to the control winding of said particular core and means for saturating said transistor, and means for applying an activating current to said activating windings substantially concurrently with said short circuiting of said control winding, said activating current being of a character to switch all of said cores except said particular core to a second remanent magnetic condition, induced currents in its short circuited control winding preventing said particular core from switching to said second remanent magnetic condition, and said activating current inducing output voltages in the output windings of each of said cores except said particular core of a polarity such that said activating current is directed through the one of said load means associated with said particular core.

2. An electrical switching circuit comprising a plurality of magnetic cores, each of said cores having hysteresis characteristics exhibiting magnetic remanence, each of said cores having a reset winding, an activating winding, an output winding and a plurality of control windings inductively coupled thereto, means for serially connecting said activating windings, a plurality of output circuits connected to the last of said serially connected activating windings, each of said output circuits including a respective one of said output windings and a load means, means for establishing a first remanent magnetic condition in all of said cores including means for applying reset signals to all of said reset windings, means for selectively short circuiting particular ones of said control windings coupled to all except a particular one of said cores, said short circuiting means including a plurality of transistors, each of said transistors being connected to a plurality of said control windings coupled to a different combination of said cores, and means for selectively saturating said transistors, and means for applying an activating current to said activating windings substantially concurrently with said short circuiting of control windings coupled to all except a selected core, said activating current being of a character to switch said selected core to a second remanent magnetic condition, the remaining cores being prevented from switching to said second remanent magnetic condition by currents induced in their short circuited control windings, and said activating current inducing an output voltage in the output winding of said selected core of a polarity such that said activating current is drawn through the one of said output circuits associated with said selected core.

References Cited by the Examiner

UNITED STATES PATENTS

| | | | |
|---|---|---|---|
| 2,719,773 | 10/55 | Karnaugh | 307—88 X |
| 2,719,961 | 10/55 | Karnaugh | 340—174 |
| 2,979,701 | 4/61 | Marchand | 340—174 |
| 2,987,708 | 6/61 | Bonn | 307—88 X |

IRVING L. SRAGOW, *Primary Examiner.*